2 Sheets--Sheet 1.

J. D. JONES.

Horse Hay-Rakes.

No. 6,154. Reissued Nov. 24, 1874.

Attest;
James L. Johnston
Jno. D. Potter

Inventor;
James D. Jones

THE GRAPHIC CO. PHOTO-LITH. 39 & 41 PARK PLACE, N.Y.

2 Sheets--Sheet 2.

J. D. JONES.

Horse Hay-Rakes.

No. 6,154. Reissued Nov. 24, 1874.

Attest;
James Johnston
Jno. D. Potten

Inventor;
James. D. Jones

THE GRAPHIC CO. PHOTO-LITH. 39 & 41 PARK PLACE, N.Y.

UNITED STATES PATENT OFFICE.

JAMES D. JONES, OF COLUMBIANA, OHIO.

IMPROVEMENT IN HORSE HAY-RAKES.

Specification forming part of Letters Patent No. 47,644, dated May 9, 1865; reissue No. 2,772, dated October 8, 1867; reissue No. 6,154, dated November 24, 1874; application filed August 11, 1873.

*To all whom it may concern:*

Be it known that I, JAMES D. JONES, of Columbiana, in the county of Columbiana and State of Ohio, have invented a certain new and useful Improvement in Horse-Rakes; and I do hereby declare that the following is a full, clear, and exact description thereof, reference being had to the accompanying drawings, and to the letters of reference marked thereon.

My invention relates to an improvement in that class of horse-rakes known as self-discharging rakes; and consists in so constructing an oscillating horse-rake that its gathering-teeth are permanently attached to the axle of its wheels, and elevated for the discharging of their gathered load, and automatically reset to gather a fresh load, and the gathering-points regulated with relation to their work in the operation of gathering by a slight backward or forward turn of the axle at the will and by the weight of the operator in his seat on the rake.

To enable others skilled in the art to make and use my invention, I will proceed to describe its construction and operation.

Figure 1:
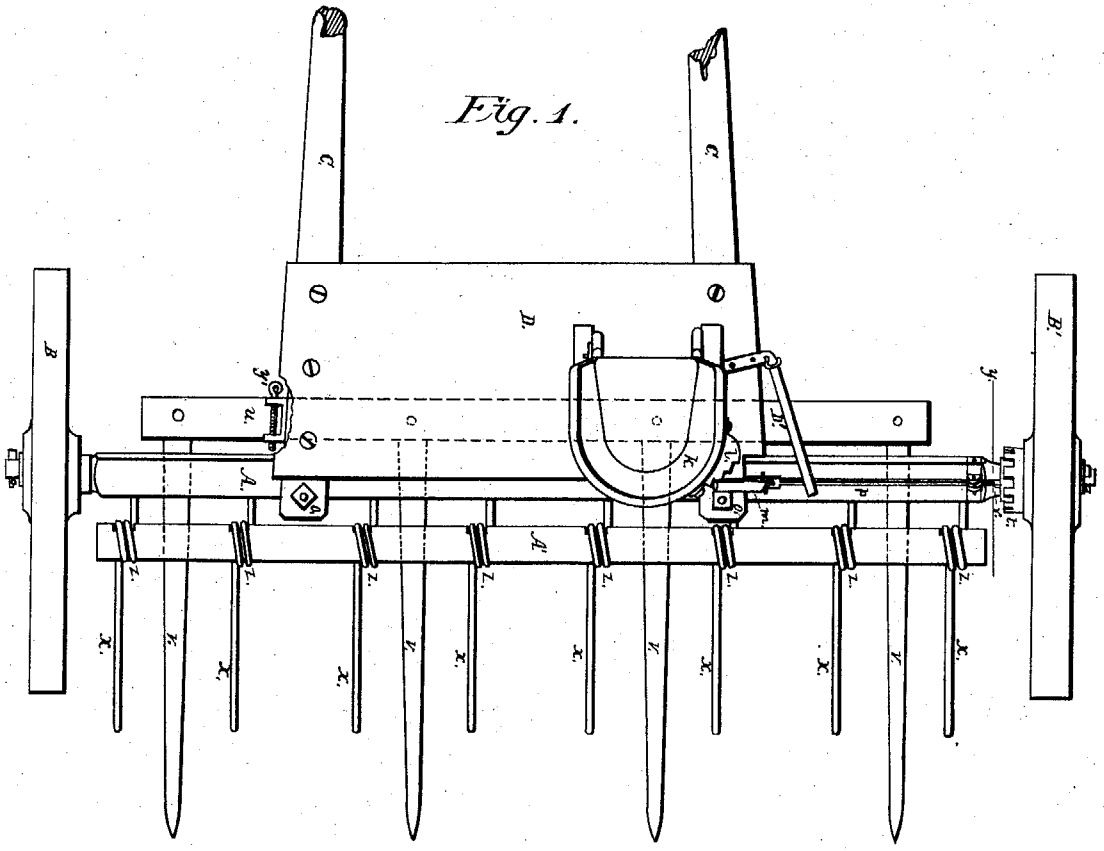
Figure 2:
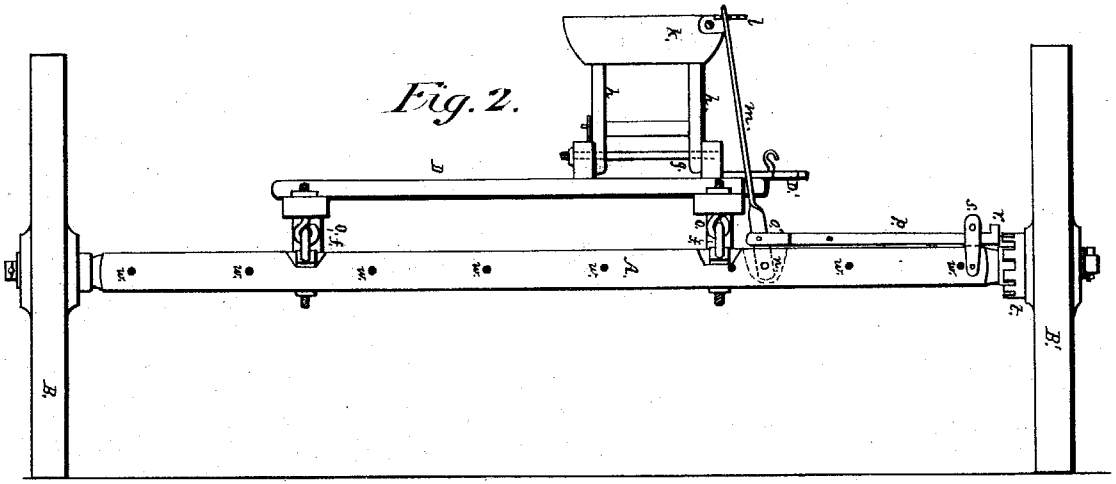
Figure 3:
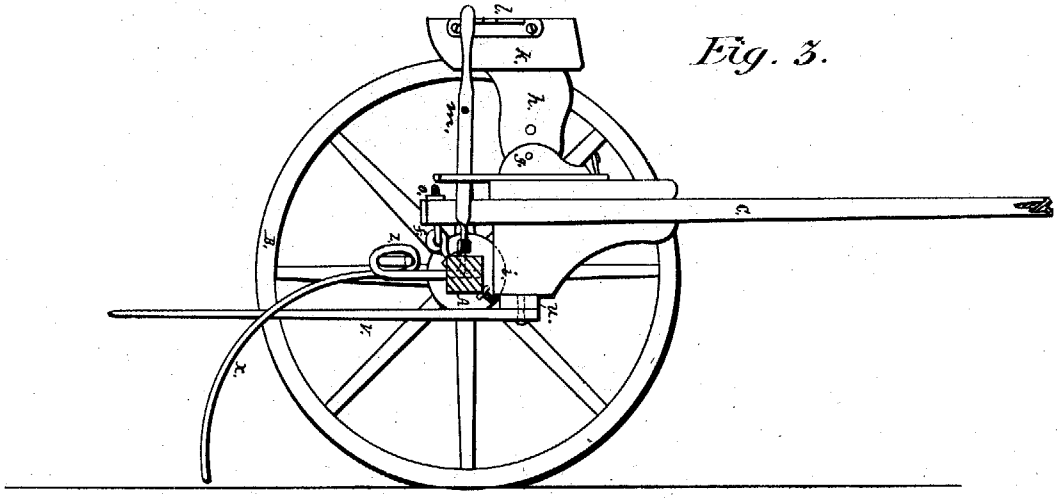

In the accompanying drawings, which form part of my specification, Figure 1 is a top view or plan of my improvement in oscillating horse-rakes. Fig. 2 is a rear end elevation representing the gathering-teeth and clearing-fingers removed. Fig. 3 is a vertical section at line *y* of Fig. 1.

A represents the axle, and B B′ its wheels. To the axle A are hinged, through the medium of adjustable ring-bolts *o f*, the thills C, on the upper side of which is secured the platform D, to which, at *g*, is pivoted the pedestal *h* of the seat *k* on the right-hand side of which is secured a catch, *l*, for the vertical lever *m* pivoted at *n* to the axle A. To the vertical lever *m* is pivoted, at *o′*, a horizontal lever, *p*, the outer end *r* of which moves in a guide, *s*, secured to the axle A. On the inner end of the hub of the wheel B′ is secured a metal flange, *t*, provided with a series of notches which in form and size are adapted to the size of the end *r* of the horizontal lever *p*. To the under side of the thills C is attached a bar, *u*, furnished with clearing-fingers *v*. The axle A is provided with openings *w* for receiving the upper end of the teeth *x*, which are secured in said openings. The screw *y′* is used for regulating the position of the teeth *x* with relation to the ground by preventing the axle A from rotating beyond a given point. The teeth *x*, which are of ordinary construction, are furnished with a coil, as indicated at *z*, for giving greater flexibility to the teeth, and thereby lessen their liability to break when subjected to undue strain. The bar A′ is placed in the opening of the coils to prevent the teeth from twisting in the axle A, and from undue lateral motion. On the right-hand side of the platform D is secured an incline arm D′, against and along the inner edge of which the vertical lever travels for unshipping the horizontal lever from the notched flange *t*.

The construction and arrangement of the several parts of the rake, and the relation these parts bear to each other, will be readily understood from the foregoing description, and by reference to the accompanying drawings. I will, therefore, proceed to describe the operation of my improvement, which is as follows: The operator being on his seat *k*, with the upper end of the vertical lever in one of the notches of the catch *l*, the forward movement of the rake will cause the teeth to gather the cut hay, and when they have gathered their load the operator forces the vertical lever *m* from the catch *l* toward the wheel B′, which will cause the end *r* of the horizontal lever *p* to enter one of the notches in the flange *t* on the hub of the wheel B′, and thereby cause the axle A to rotate with the wheel, and the rotation of the axle will raise the teeth so as to discharge their gathered load, the fingers *v* aiding in the discharge of the hay from the teeth. The vertical lever *m*, traveling with the rotating axle A, coming in contact with the inclined arm D′, will be forced toward the wheel B, and draw the end *r* of the horizontal lever *p* out of the notch in the flange *t* on the hub of the wheel B′, and the weight of the teeth will cause the axle to rotate backward until the points of the teeth *x* strike the ground, when the vertical lever *m* is slipped by the operator in one of the notches of the catch *l* on the seat *k*, and the teeth thereby reset to gather a fresh load. The teeth *x* are held to their work by the operator leaning back in the pivoted seat, so as to throw his weight against the vertical lever *m*, which acts on the axle A, and thereby holds the teeth to their work.

It will be apparent that when the vertical lever *m* is placed in one of the notches of the catch *l*, it will be held in a fixed position by the weight and back pressure of the operator on the seat K, thereby preventing the horizontal lever *p* from becoming shipped in the flange *t* by the jolting action of the rake in the operation of raking.

If the teeth have to pass over any obstruction, the operator takes hold of the lever *m*, and leans forward in his seat, whereby he is enabled to raise and hold the teeth in an elevated position until they have passed the obstruction.

Having thus described the nature, construction, and operation of my improvement, what I claim as of my invention is—

1. In a two-wheeled horse hay-rake, the teeth of which are rigidly attached to the axle, the combination of the pivoted seat *k*, vertical lever *m*, and axle A, for bringing the desired pressure on the teeth *x* in the operation of raking, substantially as herein described.

2. In a two-wheeled horse hay-rake, the teeth of which are rigidly attached to the axle, the combination of the pivoted seat *k*, vertical lever *m*, horizontal lever *p*, inclined arm D, and wheel B′, having a notched flange on its hub, substantially as herein described, and for the purpose set forth.

Witnesses: JAMES D. JONES.
A. C. JOHNSTON,
JAMES J. JOHNSTON.